United States Patent [19]
Nelson

[11] Patent Number: 6,165,598
[45] Date of Patent: Dec. 26, 2000

[54] COLOR SUPPRESSED ANTI-REFLECTIVE GLASS

[75] Inventor: Douglas Nelson, Curtis, Ohio

[73] Assignee: Libbey-Owens-Ford Co., Toledo, Ohio

[21] Appl. No.: 09/134,284

[22] Filed: Aug. 14, 1998

[51] Int. Cl.[7] .............................. B32B 5/16; B32B 7/02; G02B 1/11
[52] U.S. Cl. .................. 428/212; 428/216; 428/336; 428/428; 428/432; 428/701; 428/702; 359/359; 359/586
[58] Field of Search .................. 428/332, 336, 428/212, 216, 428, 432, 701, 702; 359/359, 360, 361, 586

[56] References Cited

U.S. PATENT DOCUMENTS

| | | | |
|---|---|---|---|
| 3,185,020 | 5/1965 | Thelen | 88/1 |
| 3,432,225 | 3/1969 | Rock | 117/33.3 |
| 4,187,336 | 2/1980 | Gordon | 428/34 |
| 4,206,252 | 6/1980 | Gordon | 427/160 |
| 4,308,316 | 12/1981 | Gordon | 428/336 |
| 4,419,386 | 12/1983 | Gordon | 427/109 |
| 4,440,822 | 4/1984 | Gordon | 428/216 |
| 4,546,050 | 10/1985 | Amberger et al. | 428/630 |
| 4,583,815 | 4/1986 | Taga et al. | 350/1.6 |
| 4,726,654 | 2/1988 | Kimura et al. | 350/164 |
| 4,971,843 | 11/1990 | Michelotti et al. | 428/34 |
| 5,194,990 | 3/1993 | Boulos et al. | |
| 5,234,748 | 8/1993 | Demiryont et al. | 428/216 |
| 5,342,676 | 8/1994 | Zagdoun | |
| 5,505,989 | 4/1996 | Jenkinson | 427/166 |
| 5,525,406 | 6/1996 | Goodman et al. | 428/216 |
| 5,780,149 | 7/1998 | McCurdy et al. | 428/336 |
| 5,891,556 | 4/1999 | Anderson et al. | 428/216 |
| 5,935,716 | 8/1999 | McCurdy et al. | 428/428 |
| 5,939,201 | 8/1999 | Boire et al. | 428/432 |
| 5,965,246 | 10/1999 | Guiselin et al. | 428/212 |

FOREIGN PATENT DOCUMENTS 436 741   7/1991   European Pat. Off. .

*Primary Examiner*—Hoa T. Le
*Attorney, Agent, or Firm*—Marshall & Melhorn

[57] ABSTRACT

A thin film stack applied onto a surface of a glass substrate. The thin film stack includes an iridescence-suppressing interlayer and an anti-reflective thin film stack applied over the iridescence-suppressing interlayer. The resulting coated glass article exhibits a low total reflectance and an aesthetically neutral color in reflectance from the film side.

25 Claims, 4 Drawing Sheets

COLOR SUPPRESSED ANTI-REFLECTIVE GLASS

BACKGROUND OF THE INVENTION

1. Field of the Invention

This invention relates to a glass substrate having a pyrolytic anti-reflective coating. More particularly, this invention relates to a combined coating stack that reduces reflection from the film side while providing an aesthetically neutral tint. Even more particularly, this invention is directed to a coating stack of an iridescence-suppressing interlayer and a multilayered anti-reflective coating stack which enhances the reduction in visible reflectance while improving the color properties of the coated glass article.

2. Summary of Related Art

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of a coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere thereby reducing the observed visual reflectance.

While anti-reflective coatings on glass substrates are capable of reducing the observed visual reflectance, the visible light that is reflected is often an undesirable non-neutral color when viewed at a 90 degree angle incident from the glass. For purposes of this invention, a neutral color is defined under the CIELAB color scale system with an a* value in the range of about 6 to about −6 and b* value in the range of about 6 to −6.

It would be advantageous to provide a coated glass article having a low visible light reflection with the reflected light being neutral in color.

It would be a further advantage to a color neutral anti-reflective coating that may be applied pyrolytically onto a glass substrate. A pyrolytic film enables the deposition of the film on-line, for example, in a float glass production process.

SUMMARY OF THE INVENTION

In accordance with the present invention, there is provided a thin film stack which may be applied onto a glass substrate to form a coated glass article. The coated glass article may be utilized as an anti-reflective article. The thin film stack of the present invention results in a reduction of reflected visible light over conventional anti-reflective coatings. Additionally, the present invention results in a desirable neutral color in visible reflection.

The thin film stack of the present invention is applied onto a surface of a glass substrate. The thin film stack includes an iridescence-suppressing interlayer deposited on and adhered to the surface of the substrate. A first coating of a transparent thin film is then deposited on and adhered to the iridescence-suppressing interlayer. A second coating of a transparent thin film is deposited on and adhered to the first coating of the transparent thin film. The refractive index of the first coating of transparent thin film is at least about 0.2 greater than the refractive index of the second coating of the transparent thin film.

The iridescence-suppressing interlayer may be a single layer, a two layer stack, or a gradient layer applied onto the glass substrate. The thicknesses of the iridescence-suppressing layer utilized in the present inventive coating are dependent upon the specific iridescence-suppressing layer utilized.

The first and second coatings of the transparent thin films are generally applied consecutively over the iridescence-suppressing interlayer. Each of the coatings is applied at thickness in the range of about 700 angstroms to about 1500 angstroms.

The coated glass article of the present invention exhibits an Illuminant C single surface reflectance, taken over a wavelength range of 390 nm to 750 nm at a normal incidence (90°) from the film side of the article, of about 1.0 or less. Preferably, the single surface reflectance from the film side is less than 0.7 and most preferably less than 0.5.

In addition to a low single surface reflection, the present invention exhibits a neutral color in reflection. The neutral color is desirable for many end use applications for the coated glass article. The neutral color is defined by CIELAB color scale values of a* in the range of about 6 to about −6 and b* in the range of about 6 to about −6.

The thin film stack of the present invention is preferably applied pyrolytically, on-line onto a float glass ribbon.

It is an object of the present invention to provide a coated glass with an improved reduction of visible reflection and an improved color in visible reflection.

It is a further object of the present invention to provide an antireflective coating that can be pyrolytically deposited onto a glass substrate. Each of the layers or films of the present coating stack may be formed using in conventional deposition precursors. The pyrolytic deposition enables the application of the film onto a float glass ribbon directly in the glass production process.

BRIEF DESCRIPTION OF THE DRAWINGS

The above, as well as other advantages of the present invention, will be become readily apparent to those skilled in the art from the following detailed description when considered in the light of the accompanying drawings in which.

DETAILED DESCRIPTION OF THE PREFERRED EMBODIMENT

Figure 1:
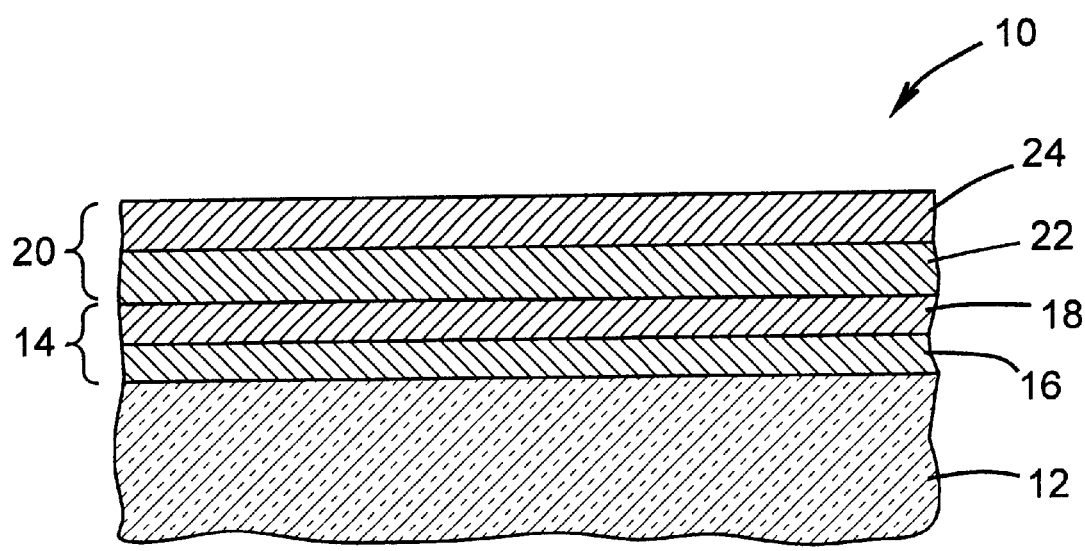
FIG. 1 is a broken sectional view of a coated glass article according to the present invention.

It has been discovered that a thin film stack, utilizing an iridescence-suppressing interlayer combined with transparent thin film coatings, is suitable for use on a glass substrate to form an anti-reflective article. The resulting coated article exhibits an improved reduction in visible reflection over conventional anti-reflective coatings while also improving the reflected color from the film side of the article.

The coated glass article of the present invention is especially suitable for applications requiring anti-reflective glass articles. For example, the coated glass article having an iridescence-suppressing interlayer and an antireflective coating may be applied with items such as computer displays, solar devices, display cases, watch crystals, eye glasses, and television screens. However, the coated glass article of the present invention may also be utilized for other applications, such as architectural glazings and vehicle windows.

The glass substrates suitable for use in preparing the coated glass article according to the present invention may include any of the conventional clear glass compositions known in the art. The preferred substrate is a clear float glass ribbon wherein the coating of the present invention, along with other optional coatings, is applied in the heated zone of the float glass process. However, other conventional processes for applying coatings on glass substrates are suitable for use with the present inventive coating. Additionally, other tinted glass substrates may be utilized as a substrate for the application of the coatings of the present invention. Tinted substrates may be selected to impart specific spectral properties in the coated article.

The iridescence-suppressing interlayer of the present invention provides a means to reflect and refract light to interfere with the observance of iridescence. Iridescence-suppressing coatings are conventionally known within the art. For example, U.S. Pat. Nos. 4,187,336, 4,419,386, and 4,206,252 herein incorporated by reference, describe coating techniques suitable for suppressing interference colors. The interlayer of the present invention may comprise a single iridescence-suppressing coating, a two component coating, or a gradient coating.

The color of light transmitted and reflected from coated glass substrates is measured according to the CIELAB color scale coordinates of a* and b*. A positive a* number indicates a red color hue and a negative value indicates a green color hue. A positive b* indicates yellow while a negative value indicates blue. A color saturation value, c*, is related to the observance of iridescence colors and is defined as the square root of $a^{*2}+b^{*2}$. A coated glass article having a saturation value or c* of less than 12 units will not exhibit iridescence.

With a single component interlayer, the suppression of iridescent colors may be accomplished by selecting an interlayer having a refractive index intermediate between the refractive indices of the glass substrate and the coating deposited onto the interlayer. An interlayer thickness selection of ¼ wavelength of a 500 nm design wavelength serves to cancel out the reflected waves and therefore suppress iridescence. Compounds suitable for use include metal oxides or metal nitrides. The most preferred composition is a silicon oxycarbide.

In a two component interlayer, the coating deposited onto and adhering to the glass substrate has a high refractive index in the visible spectrum. A second coating, having a low refractive index, is deposited on and adheres to the first coating of the interlayer. Each interlayer has a thickness selected such that the interlayer forms a combined total optical thickness of about ⅙th to about 1/12th of a 500 nm design wavelength.

The coatings suitable for use as high refractive index coatings include various metal oxides and nitrides, and their mixtures which have the proper refractive index. The preferred coating for use with the present invention is tin oxide. The low index coating of the interlayer may include silicon dioxide, silicone polymer, magnesium oxide, and cryolite, with silicon dioxide being the preferred coating.

In accordance with the present invention, a gradient coating may be utilized as an iridescence-suppressing layer. A gradient coating generally comprises a layer which gradually transitions from one metal oxide or nitride film to another. Thus, the varying compositions result in a varying refractive indices which suppress iridescent colors. For example, a single gradient coating may include silica which gradually transitions into a tin oxide, cadmium stannate, silicon nitride, titanium oxide, or indium oxide.

The iridescence-suppressing interlayers are suitably applied onto the glass substrate through conventional thin film coating applications. For example, the layers may be applied onto a float glass substrate in the heated zone of a float glass process by known chemical vapor deposition techniques or other known pyrolytic techniques.

The first coating of a transparent thin film and the second coating of a transparent thin film in the multilayer stack of the present invention are specifically applied to reduce the reflection of visible light by the principle of optical interference. Two layer anti-reflective coatings generally utilize a stack with each layer being ¼λ at a 550 nm design wavelength. The layers have alternating high and low refractive indices. Depending upon the material utilized for each film, the film thicknesses are selected to take advantage of interference and minimize the reflection which is equal to the square of the resultant amplitude. Those skilled in the art are capable of optimizing the thickness for a given film once the materials for each film are selected.

For purposes of the invention, a transparent thin film is one which has an extinction co-efficient of less than 0.1. The value of the extinction co-efficient indicates that the selected films are non-absorbing films.

The anti-reflective properties of the invention are achieved by selecting a first coating of a transparent thin film having a refractive index of at least 0.2 greater than the refractive index of the second coating of a transparent thin film. This feature provides a sufficient difference in the refractive indices to enable the reduction of reflective properties under the principle of optical interference.

In accordance with the present invention, the first coating of a transparent thin film has a preferred refractive index of about 1.8 to about 2.6. Films capable of achieving the preferred refractive index include those selected from the group consisting of metal oxides, mixed metal oxides, conductive metal oxides, zinc sulfide, silicon nitride, silicon carbide, and silicon oxycarbide. The metal component of the metal oxides, mixed metal oxides, and conductive metal oxides preferably include metals selected from the group consisting of silicon, tin, indium, aluminum, and titanium. The first coating of a transparent thin film is most preferably a titanium oxide, tin oxide, or doped tin oxide film. The thickness of the first coating is in the range of about 700 angstroms to about 1500 angstroms.

The second coating of a transparent thin film preferably has a refractive index of about 1.25 to about 1.65. Films capable having a refractive index within the desired range include metal oxides, mixed metal oxides, magnesium fluoride, aluminum oxide, and aluminum nitride. The preferred metal is silicon. However, other metal oxides or mixed metal oxides having a refractive index of about 0.2 less than the selected first coating may be suitable for use with the present invention. The most preferred coating is silicon dioxide, which in addition to possessing the desired refractive index also provides a durable outer coating. The thickness of the second coating is in the range of about 700 angstroms to about 1500 angstroms.

Optionally, as will be appreciated by those skilled in the art, the multilayered anti-reflective coating stack of the invention could include more than two layers. Thus, where the multilayered anti-reflective coating stack included, for example, three transparent thin films, the refractive index of the second coating would be higher than that of both the first and the third coatings. In addition, a thin protective overcoat (not shown) could be applied over the multilayered anti-reflective coating stack which, if sufficiently thin, would not significantly affect the exhibited reflection regardless of its refractive index.

The first coating, second coating, and optional third coating are suitably prepared and applied onto the glass substrate by any of the conventional pyrolytic deposition methods generally recognized within the art. For example, the coatings may be applied onto a float glass ribbon in the heated zone of a float glass production process. A conventional coating apparatus may be utilized in the heated zone of float bath to apply the coatings of the present invention.

One example of a coated glass article produced in accordance with the present invention is depicted in FIG. 1. The coated glass article 10 comprises a glass substrate 12 with an iridescence-suppressing interlayer 14. As illustrated in FIG. 1, the iridescence-suppressing interlayer 14 is made up a first layer 16 of, for example, tin oxide. A second layer 18 of, for example, silicon dioxide, is applied over the tin oxide layer 16 to complete the iridescence-suppressing interlayer 14. A multilayered anti-reflective coating stack 20 is applied over the iridescence-suppressing interlayer 14. The anti-reflective coating stack 20 includes a first coating 22 of, for example, a fluorine doped tin oxide. A second coating 24 of, for example, a silicon dioxide is then applied onto the first coating 22 of the anti-reflective coating stack 20.

The resulting article produced in accordance with the present invention is an anti-reflective glass article which exhibits a total reflection of less than 5%, preferably less than 4.8% and most preferably less than 4.5%. The measured reflection is an integrated value of Illuminant C reflectance over a wavelength range of 390 nm to 750 nm at a normal incidence to the substrate off of the coated surface. The measurement represents the reflection from all surfaces of the coated article. A single surface reflection from the film side is measured under the same noted conditions and is 1% or less. Preferably, the single surface reflection is less than 0.7% and most preferably less than 0.5%. The above values are for a coated glass article in accordance with the invention in which the glass substrate is clear glass. Of course, with a body tinted glass substrate, the measured reflectance will be lower.

The coated article of the present invention exhibits an aesthetically neutral color in reflectance. The color is preferably indicated by CIELAB color scale values of a* in the range of about 6 to about −6 and b* in the range of about 6 to about −6.

In comparison to conventional anti-reflective coatings, the present invention achieves a significant improvement in color, while also reducing the visible reflection. Conventional two layer anti-reflective coatings generally utilize a stack with each layer being ¼λ at a 550 nm design wavelength. The layers have alternating high and low refractive indices. An example would include an undoped tin oxide layer of about 705 angstroms thick on a 0.125 inch glass substrate with a silicon dioxide layer of about 950 angstroms thick applied over the tin oxide layer. The resulting coated articles exhibit a visible light transmittance (Ill C) of 92.5% and a visible reflection of 5.5%.

The following examples, which constitute the best mode presently contemplated by the inventors for practicing the present invention, are presented solely for the purpose of further illustrating and disclosing the present invention, and are not to be construed as a limitation on the invention.

EXAMPLES 1–9

A series of nine different Examples were run on a computer program utilizing conventional modeling algorithms to simulate various coating stacks. The computer model provides optical and spectral properties of each coated article.

Each of the coated glass articles may be generally produced in a float glass process on a clear float glass ribbon having a thickness of 0.125 inches, although obviously the thickness of the glass substrate may be varied greatly. A series of conventional coating devices may be used in succession in the heated zone of a float bath to pyrolytically deposit the coating stacks onto the substrate. Conventional deposition precursors may be utilized to obtain the individual coatings.

In Examples 1 through 3, a series of coatings were applied onto glass substrates to demonstrate the present invention. Example 1 demonstrates an anti-reflective coating without an iridescence-suppressing interlayer. Example 2 includes a 650 angstrom coating of a single iridescence-suppressing interlayer of a silicon oxycarbide. Example 3 includes a two layer iridescence-suppressing interlayer of 150 angstroms of tin oxide followed by 150 angstroms of silicon dioxide. An anti-reflective stack of a 950 angstroms of tin oxide followed by 800 angstroms of silicon dioxide are applied over the iridescence-suppressing interlayer, or, with Example 1, over the glass substrate.

Figure 2:
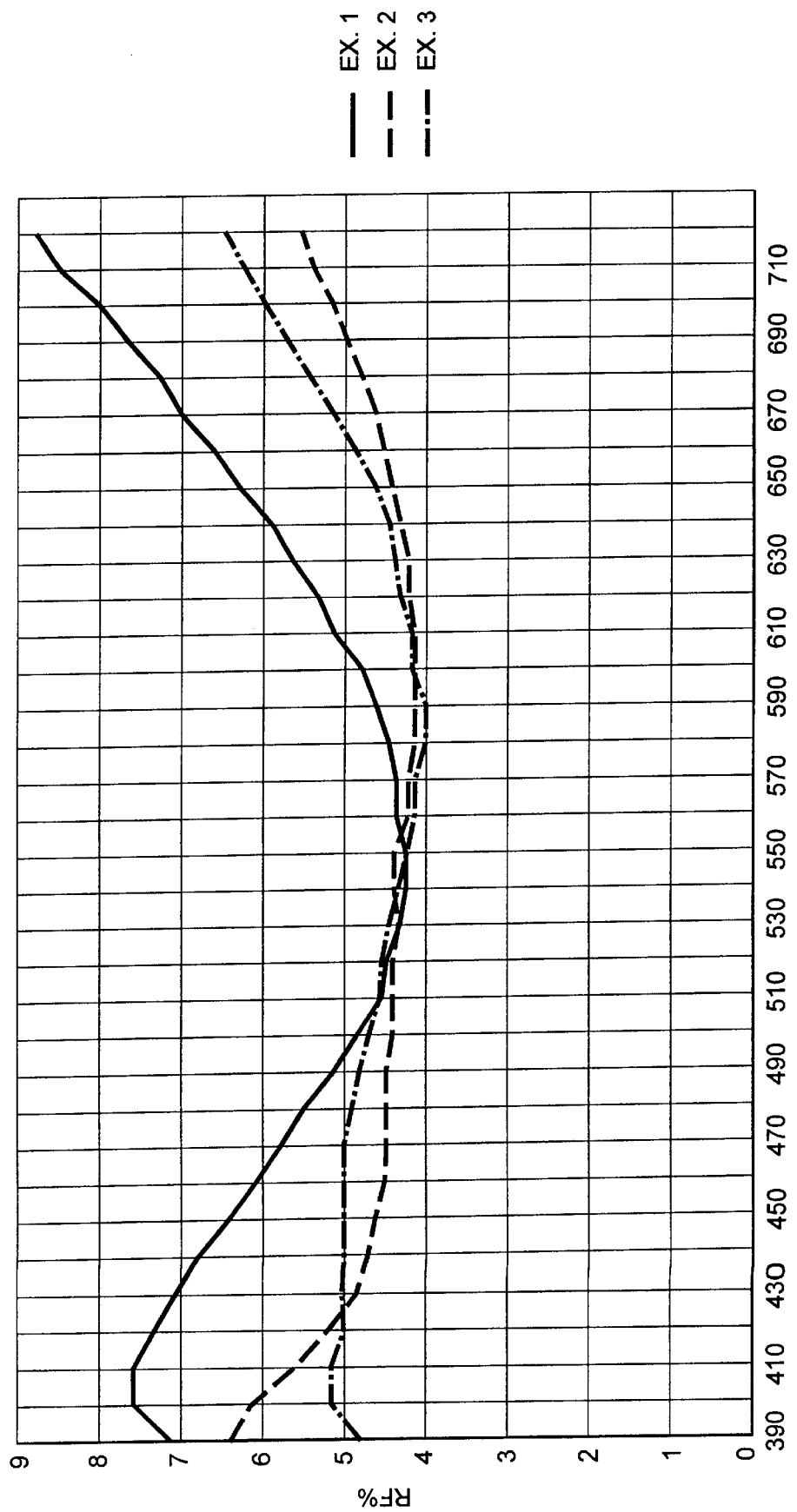
FIG. 2 is a graph of total reflection over a wavelength range of 390 nm to 720 nm for several coated glass articles.

Table 1 lists the coating stacks for each example and provides the resulting total reflection, ILL C at normal incidence from the film side, and the corresponding a* and b* values. The a* and b* values indicate that the color neutrality of the coated articles with an iridescence-suppressing interlayer is significantly improved over the color of the anti-reflective stack of Example 1. FIG. 2 is a graph of the total reflection for Example 1–3, as measured over the wavelength range of 390 nm to 720 nm. The figure demonstrates the reduction in total reflection and the improvement in color neutrality by the coated articles produced in accordance with the present invention. The improvement in color neutrality is attributed to the reduction of reflectance at the extreme ends of the measured spectrum.

Figure 3:
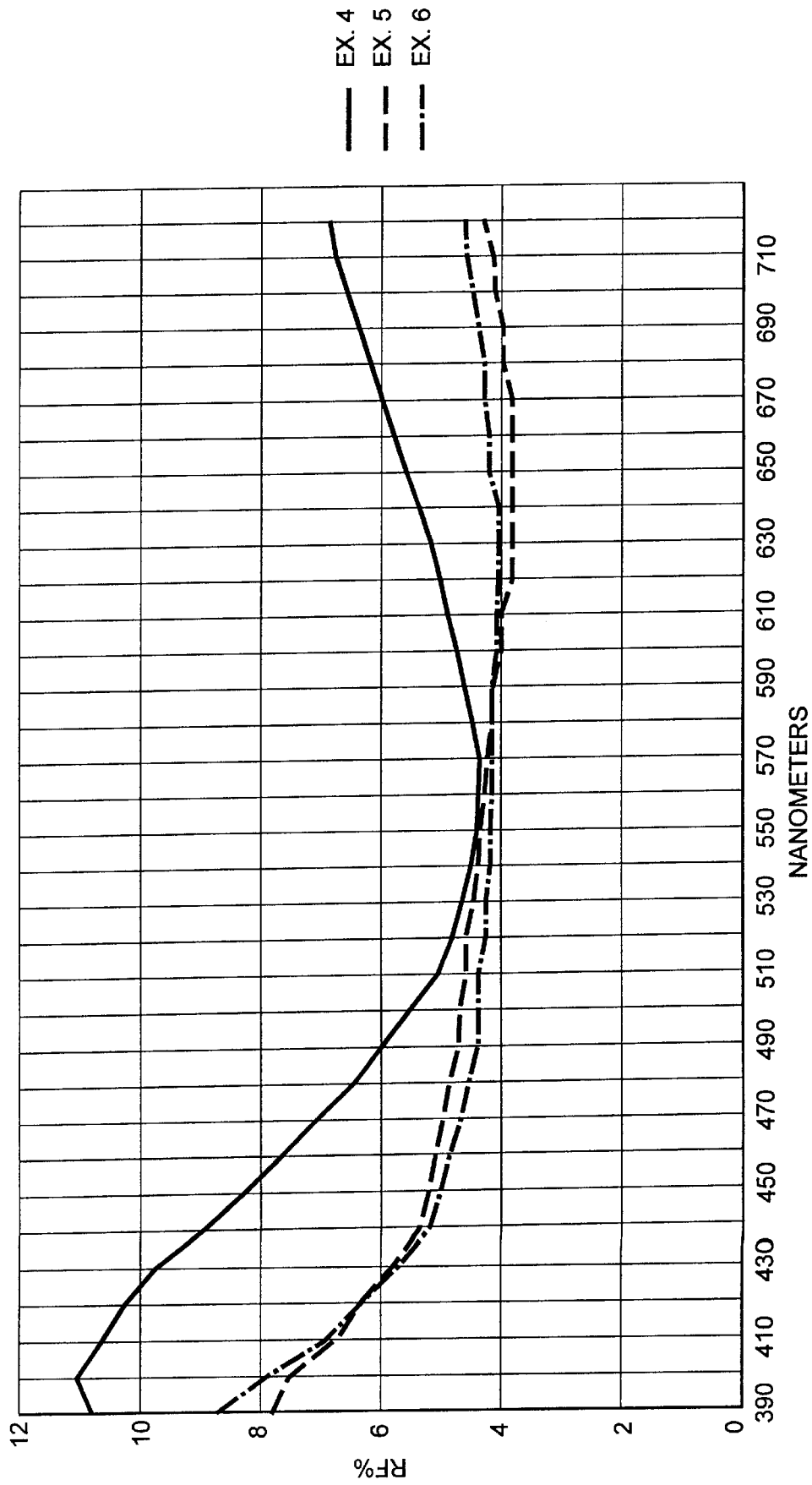
FIG. 3 is a graph of total reflection over a given wavelength range of 390 nm to 720 nm for several coated glass articles.

Examples 4–6 provide a similar comparison as Examples 1–3. Examples 5 and 6 each include an iridescence-suppressing interlayer. In examples 4–6, the anti-reflective coatings include a first thin film of 800 angstroms of fluorine doped tin oxide followed by 900 angstroms of silicon dioxide. The thicknesses for each of corresponding films are listed in Table 1. FIG. 3 is a graph of the total reflectance over a wavelength range of 390 nm to 720 nm. The figure indicates the improvement of the coated articles utilizing the coating stack of the present invention.

Figure 4:
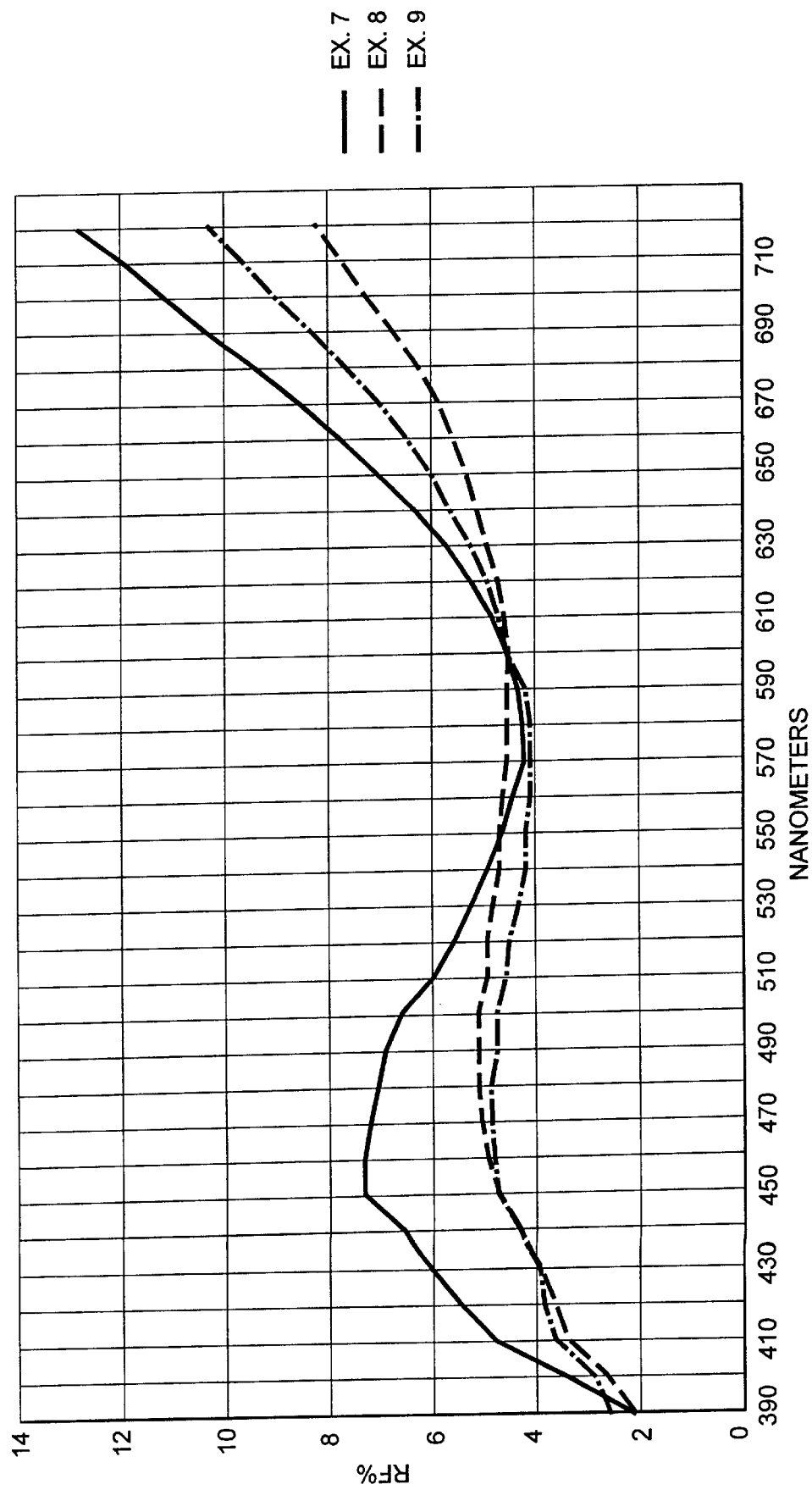
FIG. 4 is a graph of total reflection over a wavelength range of 390 nm to 720 nm for several coated glass articles.

Examples 7–9 also provide a similar comparison as examples 1–3. Examples 8 and 9 each include an iridescence-suppressing interlayer. Example 7 includes a anti-reflective stack without an underlying iridescence-suppressing interlayer. The anti-reflective stack for each Example includes a 1000 angstrom layer of titanium oxide followed by a 725 angstrom layer of silicon dioxide. Table 1 lists the thicknesses for the layers comprising the coating stacks of each Example. FIG. 4 is a graph of the total reflectance over a wavelength range of 390 nm to 720 nm for each of the coated articles in examples 7–9. The figure indicates the improvement of the coated articles utilizing the coating stack of the present invention over the conventional anti-reflective stack of Example 7.

TABLE 1

| Example | Coated Article (thicknesses in angstroms) | RF % | a* (film) | b* (film) |
| --- | --- | --- | --- | --- |
| 1 | 800 SiO2/950 SnO2/glass | 4.6 | 7 | −7.6 |
| 2 | 800 SiO2/950 SnO2/650 SICO/glass | 4.3 | 0.5 | −2 |
| 3 | 800 SiO2/950 SnO2/150 SiO2/150 SnO2/glass | 4.3 | 1.1 | −3.7 |
| 4 | 900 SiO2/800 SnO2:F/glass | 4.8 | 8.3 | −14.1 |
| 5 | 900 SiO2/800 SnO2:F/620 SICO/glass | 4.3 | 0.4 | −4.8 |
| 6 | 900 SiO2/800 SnO2:F/235 SiO2/210 SnO2/glass | 4.2 | 1.5 | −4.1 |
| 7 | 725 SiO2/1000 TiO2/glass | 5 | 2.7 | −7.2 |
| 8 | 725 SiO2/1000 TiO2/675 SICO/glass | 4.6 | −1.2 | 0.8 |
| 9 | 725 SiO2/1000 TiO2/300 SiO2/175 SnO2/glass | 4.4 | 1.8 | −0.2 |

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A glass article, comprising:
   (a) a glass substrate having a surface,
   (b) an iridescence-suppressing interlayer deposited on and adhering to the surface of the glass substrate;
   (c) a first coating of a transparent thin film deposited on and adhering to said iridescence-suppressing interlayer; and
   (d) a second coating of a transparent thin film deposited on and adhering to said first coating to form a coated glass article, said first coating having a refractive index of at least 0.2 greater than a refractive index of said second coating, said coated glass article having a single surface reflectance, Illuminant C at normal incidence from the film side, of one or less.

2. A glass article as recited in claim 1, wherein said first coating of a transparent thin film is selected from the group consisting of metal oxides, mixed metal oxides, conductive metal oxides, zinc sulfide, silicon nitride, silicon carbide, and silicon oxycarbide.

3. A glass article as recited in claim 2, wherein said metal oxides, mixed metal oxides, and conductive metal oxides include metals selected from the group consisting of silicon, tin, indium, aluminum, and titanium.

4. A glass article as recited in claim 1, wherein said second coating of transparent thin film is selected from the group consisting of metal oxides, mixed metal oxides, magnesium fluoride, aluminum oxide, and aluminum nitride.

5. A glass article as recited in claim 4, wherein said metal oxides, mixed metal oxides, and conductive metal oxides include metals selected from the group consisting of silicon, tin, indium, and titanium.

6. A glass article as recited in claim 1, wherein said first coating of a transparent thin film has a refractive index of about 1.8 to about 2.6.

7. A glass article as recited in claim 1, wherein said second coating of a transparent thin film has a refractive index of about 1.25 to about 1.65.

8. A glass article as recited in claim 1, wherein said coated glass article has a total reflectance, Illuminant C at normal incidence from the film side, of less than 5%.

9. The coated glass article of claim 1, wherein said interlayer has a refractive index defined as about the square root of the multiple of the refractive indices of said glass, said first coating, and said second coating, said interlayer having a total optical thickness of about ¼ wavelength of a 500 nanometer design wavelength.

10. The coated glass article of claim 1, wherein said interlayer further comprises two component layers including,
   (a) a first component layer of relatively high index refractive index material deposited on and adhering to the glass substrate;
   (b) a second component layer of a relatively low refractive index material deposited on and adhering to the first component layer, wherein each component layer has a thickness such that the combined interlayer forms an iridescence suppressing means with a total optical thickness of about ⅙th to about 1/12th of a 500 nanometer design wavelength.

11. A glass article as recited in claim 10, wherein said first component layer and said second component layer each have thickness in the range of about 150 angstroms to about 300 angstroms.

12. The coated glass article of claim 1, further comprising a third coating of a transparent thin film deposited on and adhering to said second coating, said third coating having a refractive index of at least 0.2 greater than the refractive index of said second coating.

13. A glass article as recited in claim 1, wherein said article exhibits a neutral color in reflectance from the film side as defined in the CIELAB system having an a* value from about 6 to about −6 and a b* value of about 6 to about −6.

14. A glass article as recited in claim 1, wherein said glass substrate is a float glass ribbon and said iridescence-suppressing interlayer and said first and second coatings are deposited onto the glass substrate in a float glass ribbon process.

15. A glass article as recited in claim 1, wherein said first coating and said second coating each have a thickness of about 700 angstroms to about 1500 angstroms.

16. A glass article as recited in claim 1, wherein said transparent thin films have an extinction co-efficient of about 0.1 or less.

17. A glass article, comprising:
   (a) a glass substrate having a surface,
   (b) an iridescence-suppressing interlayer deposited on and adhering to the surface of the glass substrate;
   (c) a first coating of a transparent thin film deposited on and adhering to said iridescence-suppressing interlayer; and
   (d) a second coating of a transparent thin film deposited on and adhering to said first coating to form a coated glass article, said first coating having a refractive index of at least 0.2 greater than a refractive index of said second coating, said glass article having a neutral color in reflectance from the film side as defined in the CIELAB system having an a* value from about 6 to about −6 and a b* value of about 6 to about −6.

18. A glass article as recited in claim 17, wherein said coated glass article has a single surface reflectance, Illuminant C at normal incidence from the film side, of one or less.

19. A glass article as recited in claim 17, wherein said first coating of a transparent thin film is selected from the group consisting of metal oxides, mixed metal oxides, conductive metal oxides, zinc sulfide, silicon nitride, silicon carbide, and silicon oxycarbide.

20. A glass article as recited in claim 19, wherein said metal oxides, mixed metal oxides, and conductive metal oxides include metals selected from the group consisting of silicon, tin, indium, aluminum, and titanium.

21. A glass article as recited in claim 17, wherein said second coating of transparent thin film is selected from the group consisting of metal oxides, mixed metal oxides, magnesium fluoride, aluminum oxide, and aluminum nitride.

22. A glass article as recited in claim 21, wherein said metal oxides, mixed metal oxides, and conductive metal oxides include metals selected from the group consisting of silicon, tin, indium, and titanium.

23. A glass article as recited in claim 17, wherein said first coating of a transparent thin film has a refractive index of about 1.8 to about 2.6.

24. A glass article as recited in claim 17, wherein said second coating of a transparent thin film has a refractive index of about 1.25 to about 1.65.

25. A glass article as recited in claim 17, wherein said first coating and said second coating each have a thickness of about 700 angstroms to about 1500 angstroms.

* * * * *